(No Model.)
J. JONES.
VALVE.
No. 264,087. Patented Sept. 12, 1882.
Fig. 1.
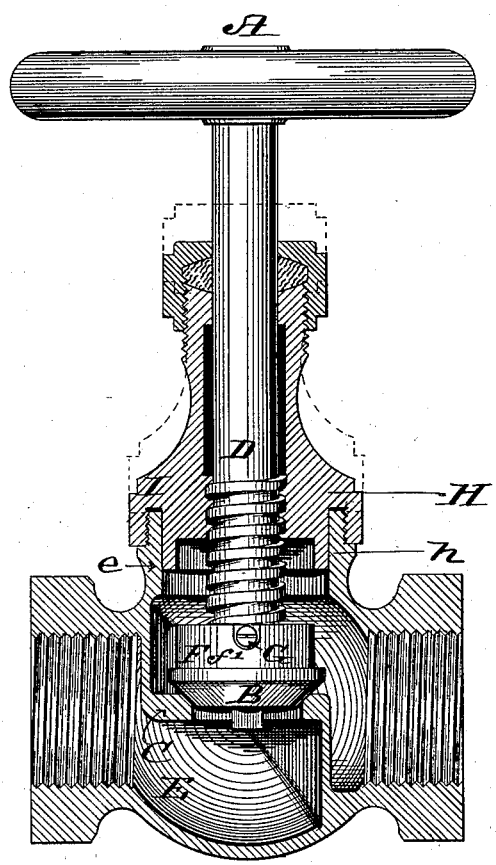
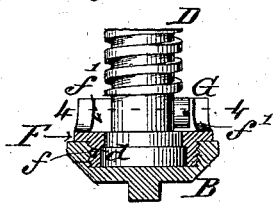
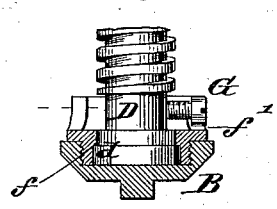
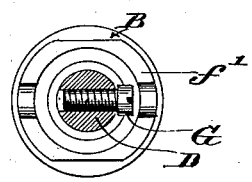
Fig. 2. Fig. 3. Fig. 4.
Attest:
Francis Vallé
Charles Pickles
Inventor:
James Jones.
by C. D. Moody, atty.

UNITED STATES PATENT OFFICE.

JAMES JONES, OF ST. LOUIS, MISSOURI.

VALVE.

SPECIFICATION forming part of Letters Patent No. 264,087, dated September 12, 1882.

Application filed June 6, 1882. (No model.)

*To all whom it may concern:*

Be it known that I, JAMES JONES, of St. Louis, Missouri, have made a new and useful Improvement in Valves, of which the following is a full, clear, and exact description, reference being had to the annexed drawings, making part of this specification, in which—

Figure 1 is a sectional view of a valve having the improvement; Fig. 2, a side elevation, partly in section, of the valve-stem and valve; Fig. 3, a view similar to that of Fig. 2, but showing the locking-screw drawn out to interlock the valve and stem; and Fig. 4, a horizontal section taken on the line 4 4 of Fig. 2.

The same letters denote the same parts.

The present invention is an improvement in valves having regrinding attachments.

A represents a valve having the improvement in question. B represents the valve proper; C, the valve-seat; D, the valve-stem; and E the valve-chamber, all of the usual description, saving as modified by the present improvement.

The valve B is connected with the stem D by means of the collar F, the valve being screwed onto the collar and the collar being held upon the stem by means of the shoulder $d$ of the stem coming against a corresponding shoulder, $f$, on the collar. As thus made and connected the valve and collar, although attached to the stem, can be rotated freely thereon; but in grinding the valve it must be rigidly connected with the stem. This is accomplished as follows.

G represents a screw engaging in the stem D and capable of being screwed into and out of the stem, as indicated in Figs. 2 and 3 respectively. When the screw is as shown in Fig. 2 the valve is loose upon its stem; but when the screw is drawn out from the stem, as in Fig. 3, the screw, at its outer end, intersects a flange, $f'$, with which the collar is provided, causing the collar and stem to become interlocked and the valve, for the time being, to turn with the stem. This is done when it is desired to grind the valve, and after the valve is ground the screw G is screwed into the stem sufficiently for its outer end to come inside the flange $f'$. The valve B can then rotate upon the stem as before.

In grinding the valve it is necessary to guide the lower end of the stem. This is effected by means of the collar H. This collar is made part, preferably, of the cap I of the valve-chamber, and is furnished with a flange, $h$, which fits into the neck $e$ of the valve-chamber. The valve-stem and valve are thus properly centered during the operation. The position of the cap during the regrinding is indicated by the dotted lines in Fig. 1, the cap being unscrewed until its thread is disengaged from the valve-chamber, but leaving the flange $h$ within the neck $e$.

I claim—

1. The combination of the valve B, the collar F, having the flange $f'$, the stem D, the screw G, the collar H, the cap I, and the valve-chamber E, substantially as described.

2. The combination of the chamber E, the cap I, the collar H, having the flange $h$, and the stem D, substantially as described.

JAMES JONES.

Witnesses:
C. D. MOODY,
CHARLES PICKLES.